F. W. KREMER.
COMBINED PNEUMATIC AND SOLID TIRE.
APPLICATION FILED MAY 23, 1919. RENEWED DEC. 9, 1921.

1,407,070.

Patented Feb. 21, 1922.

INVENTOR
FRANKLIN W. KREMER
BY
W H Crichton Clarke
ATTORNEY

UNITED STATES PATENT OFFICE.

FRANKLIN W. KREMER, OF RUTHERFORD, NEW JERSEY.

COMBINED PNEUMATIC AND SOLID TIRE.

1,407,070.  Specification of Letters Patent.  Patented Feb. 21, 1922.

Application filed May 23, 1919, Serial No. 299,196. Renewed December 9, 1921. Serial No. 521,251.

*To all whom it may concern:*

Be it known that I, FRANKLIN W. KREMER, a citizen of the United States, residing in the city of Rutherford, county of Bergen, and State of New Jersey, have invented a new and useful Improvement in a Combined Pneumatic and Solid Tire, of which the following is a specification.

This invention relates to a combined pneumatic and solid tire.

A serious difficulty which is encountered with solid tires for heavy vehicles is that they limit the speed of travel. If a truck with a solid tire is travelling too fast and strickes a heavy stone, the solid tire backed by a rigid rim is unable to smother or absorb the shock as a pneumatic tire would do, and the result is likely to be an accident. It is chiefly on this account that heavy trucks are held down to rates of speed below what they could be made to attain.

Moreover, it is found that even under slow speed conditions there is a great wear and tear on the solid tires due to the semi-rigid nature of the tire and its backing or rim support.

I have devised a tire combining the advantages of a pneumatic and a solid tread, and equipped with what amounts to an inwardly but not outwardly nor sidewise yieldable backing or rim structure for the solid tread.

The accompanying drawing represents an embodiment of my invention, it being understood that changes in this embodiment of invention can be made within the scope of what is claimed and as indicated by the variations in the claims without departing from the spirit of the invention.

In the drawing

Like reference numerals indicate corresponding parts in the different figures of the drawing.

Figure 1:
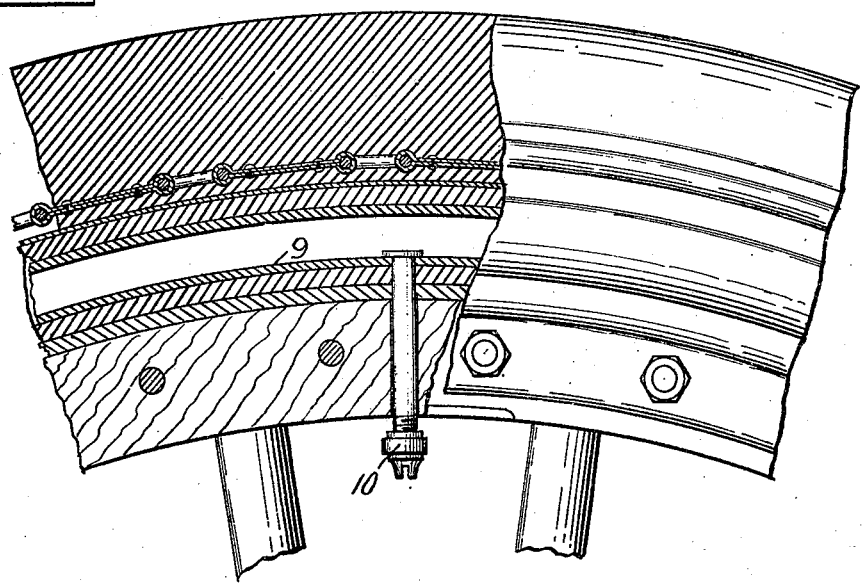
Figure 1 is a side elevation, partly in longitudinal section of the improved tire.
Figure 2:
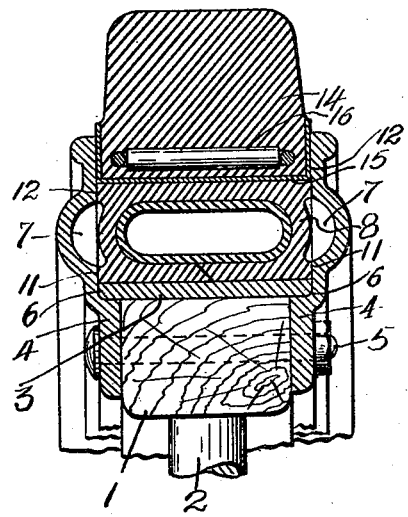
Figure 2 is a cross-section of the tire.

The wheel of the present invention is made with any suitable felly 1 and spokes 2.

The rigid rim construction preferable consists of the felly ring 3 and the side plates 4—4 suitably and removably fastened to the felly 1, as by the bolts 5.

The side plates 4—4 are formed preferably with angle recesses or shoulders 6—6 to receive and support the inner corners of the felly ring 3 and form in conjunction therewith a rigid rim structure.

The side plates 4—4 are also formed with the annularly extending arch-shaped chambers 7—7 into which the pneumatic or other cushion or chamber 8 is free to expand in a lateral direction when a part of it is inwardly compressed.

The cushion 8 is a full-base structure of symmetrical cross-section as shown, in order that its inside and outside shape, faces and dimensions shall be of uniform cross section, and in reinforcing the rubber cushion with fabric, the fabric instead of being applied on the bias, is wrapped on spirally "on the straight" so as to prevent any stretch of the fabric so far as possible.

The inner tube 9 is of the elliptical or flattened shape shown and is provided with the valve stem 10 for maintaining its pressure, although it will be understood that if desired the valve stem may be omitted.

The cushion 8 is formed with inner and outer side faces 11 and 12 which engage against corresponding faces of the side plates 4—4; the side faces 12—12 being slidable inwardly and outwardly relative to the side plates.

The solid tread 14 has vulcanized or otherwise suitably secured thereto a U-shaped member 15 formed of any suitable wear resisting material or composition such as hard rubber, the side walls of which slidably engage the side plates 4—4 as wear-resisting members.

The member 15 is vulcanized or otherwise suitably secured to the cushion 8.

Figure 3:
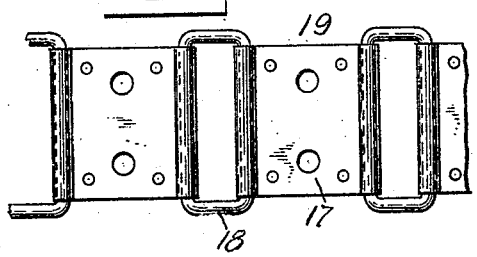
Figure 3 is a plan view of the inwardly but not outwardly or sidewise yieldable reinforcing structure.
Figure 4:
Figure 4 is a side or edge view of the yieldable or linked structure.

The tread 15 has imbedded in the inner portion thereof or substantially located between it and the cushion 8 an outer rim structure 16 which is so constructed as to be inwardly but not outwardly or sidewardly yieldable. This outer rim structure preferably is formed, as shown in Figures 3 and 4 of metal plates 17 hinged together by the elongated links 18 and having perforations 19 therein. The rubber of the tread 14 is vulcanized to and through the rim structure 17 and is held thereby against outward or sidewise yielding while permitted at any particular point of pressure to yield inwardly upon the cushion without transmitting said yielding movement to all the remaining portions of the outer and yieldable rim.

The tire of the present invention is strong, simple, durable, and relatively inexpensive in construction as well as thoroughly efficient in operation. It is adapted to be applied to standard forms of wheels and it effectively combines the advantages of solid and pneumatic treads, possessing the strength and wear resisting qualities of the one with the high-speed qualities of the other. Moreover it possesses a length of life which exceeds that of either the solid or pneumatic tire when used alone on heavy work.

What is claimed as new is:

1. A yieldingly supported solid tire having embedded therein an inwardly but not sidewardly yieldable reinforcing structure of a substantially uniform width nearly equal to the width of the tire.

2. A yieldingly supported solid tire having embedded therein an inwardly but not sidewardly yieldable continuous reinforcement of nearly the same width as the tire, side-plates embracing the sides of said tire and extending outwardly beyond said reinforcement, and expansion chambers in said side-plates, and an inside yielding tube supporting said tire and expansible into said side-chambers.

3. A yieldingly supported solid tire having embedded therein an inwardly but not outwardly yieldable reinforcement of a substantially uniform cross section and of a width nearly equal to the width of the tire.

4. A cushion-solid tire having fabric wrapped on the straight around the cushion, and a hinged metallic structure around the cushion.

5. A tire having a tread, an inwardly but not outwardly yieldable structure therefor, of a width nearly equal to the width of the tire and means for preventing side movement of said tread on said structure.

6. A cushion-solid tire having fabric wrapped on the straight around the cushion and an inwardly but not outwardly yieldable reinforcement disposed around the cushion.

7. A tire comprising an inner ring, side plates combined with and supporting said ring and forming therewith a rim having annular expansion channels in the side walls thereof, a symmetrical casing having outer side walls slidable against the inner rim, a tread mounted on said casing and having a U-shaped member interposed between it and said casing and between it and the side walls of said rim, and an inwardly but not outwardly or sidewardly yielding reinforcing structure vulcanized in the inner portion of said tread and formed of perforated plates and elongated links hinging said plates together.

FRANKLIN W. KREMER.